United States Patent [19]

Rao et al.

[11] Patent Number: 4,720,972
[45] Date of Patent: Jan. 26, 1988

[54] LOW ENERGY REGENERATION SYSTEM FOR PARTICULATE TRAP FOR AN INTERNAL COMBUSTION ENGINE

[75] Inventors: V. Durga N. Rao, Bloomfield Township, Oakland County; Wallace R. Wade, Farmington Hills, both of Mich.

[73] Assignee: Ford Motor Company, Dearborn, Mich.

[21] Appl. No.: 919,947

[22] Filed: Oct. 17, 1986

[51] Int. Cl.$^4$ .................................................. F01N 3/02
[52] U.S. Cl. .................................. 60/274; 60/286; 60/295; 60/298; 60/303
[58] Field of Search .................. 60/286, 303, 298, 274, 60/295, 296; 55/DIG. 30, 283, 466

[56] References Cited

U.S. PATENT DOCUMENTS

| | | | |
|---|---|---|---|
| 3,100,146 | 8/1963 | Huntington. | |
| 4,319,453 | 3/1982 | Mann. | |
| 4,359,863 | 11/1982 | Virk | 60/298 |
| 4,373,330 | 2/1983 | Stark | 60/303 |
| 4,485,622 | 12/1984 | Takagi | 60/303 |
| 4,492,079 | 1/1985 | Takagi et al. . | |
| 4,538,411 | 9/1985 | Wade et al. . | |
| 4,544,388 | 10/1985 | Rao et al. . | |
| 4,567,725 | 2/1986 | Shinzawa et al. . | |

*Primary Examiner*—Douglas Hart
*Attorney, Agent, or Firm*—Joseph W. Malleck; Roger L. May

[57] ABSTRACT

An apparatus for use with an internal combustion engine such as a diesel engine which emits hydrocarbons and particulates is disclosed. The apparatus is for use with an engine having a primary exhaust conduit, a flow divider defining parallel exhaust conduits connected to the primary exhaust conduit, and a pair of particulate traps, one each disposed in each of the parallel exhaust conduits and each of said traps having a frontal face exposed to the exhaust gas flow and one of the parallel exhaust conduits. The apparatus comprises (a) a heat exchange means disposed in the primary exhaust conduit for reducing the temperature of the exhaust gases for promoting partial condensation of hydrocarbons; (b) syphon means to conduct a separate syphoned flow of exhaust gas from the primary exhaust conduit around the heat exchanger to the frontal face of each of the traps; (c) a pair of valves, each responsive to a pressure differential between the primary exhaust conduit and a different parallel exhaust conduit to separately control each flow of the exhaust gas through said syphon means; (d) flow control means for selectively promoting pressure differential between one of the parallel exhaust conduits and a primary exhaust conduit while dissipating any significant pressure difference between the primary exhaust conduit and the other parallel exhaust conduit; and (e) means to augment the heat of the syphoned exhaust gas to facilitate ignition of the collected particles at the frontal face of a trap exposed to such exhaust gas.

19 Claims, 1 Drawing Figure

U.S. Patent     Jan. 26, 1988     4,720,972
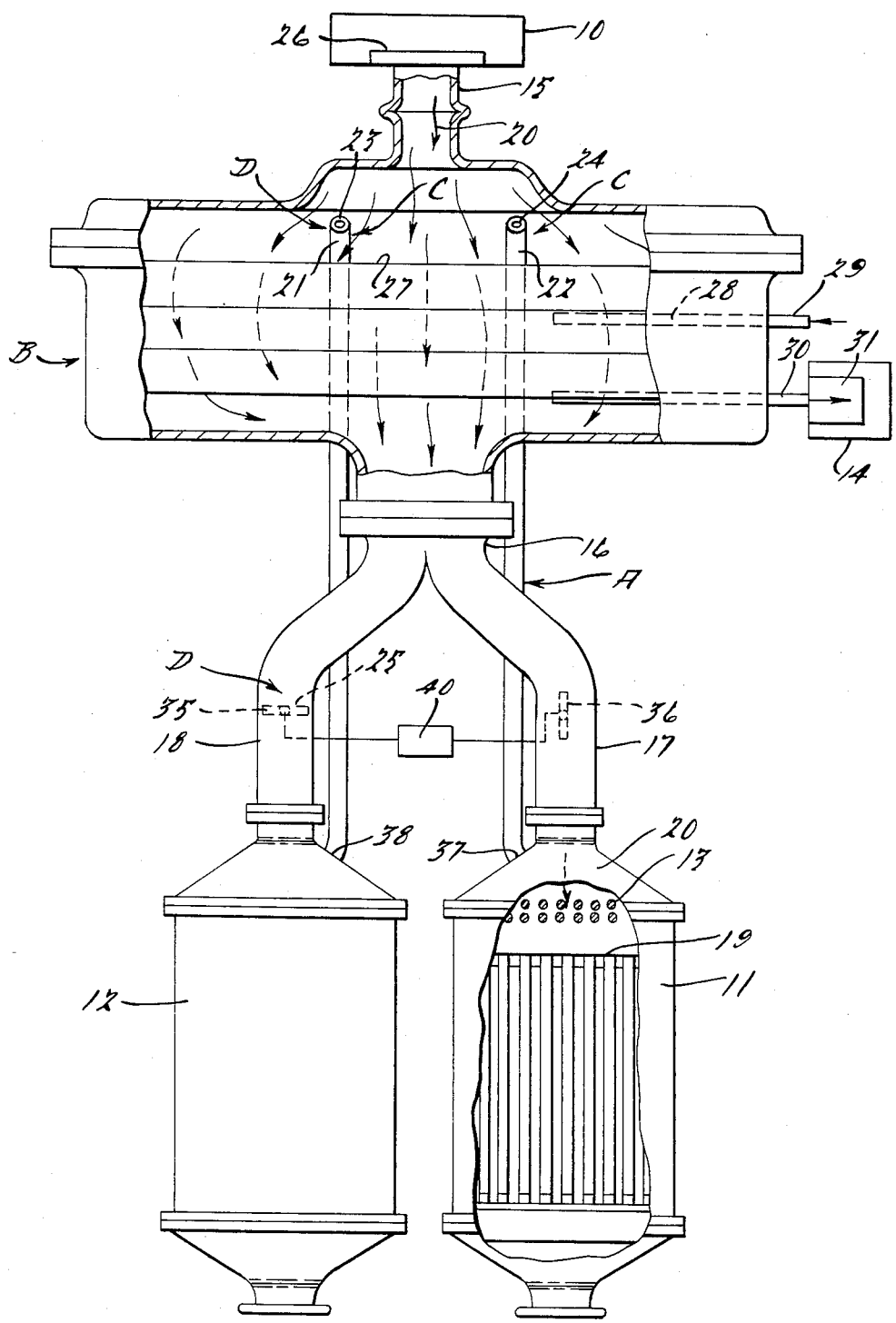

LOW ENERGY REGENERATION SYSTEM FOR PARTICULATE TRAP FOR AN INTERNAL COMBUSTION ENGINE

BACKGROUND OF THE INVENTION

1. Technical Field

This invention relates to systems for removing particulates from the exhaust emissions of an internal combustion engine (particularly a diesel engine) and, more particularly, to the use of cooling to promote the removal of both hydrocarbons and carbon particulates from such emissions.

2. Description of the Prior Art

Certain benefits of cooling the exhaust gas downstream of the engine but upstream of a conventional particulate trap have been recognized. It facilitates the cleaning of exhaust gases as disclosed in U.S. Pat. No. 4,319,453. In this reference, the cooling of the exhaust gas by an air to air heat exchanger reduces the exhaust gas temperature to below 150° F. (120°–150° F.) and condenses out substantially all of the heavy hydrocarbons contained as a gaseous emission in the exhaust gas; such hydrocarbons are absorbed by the carbon particulates also contained in such exhaust gas. Condensation of substantially all of the hydrocarbons will unduly saturate the carbon particles, inhibiting the lowering of ignition temperature of the carbon particles. Maximization of such hydrocarbon condensation is desired by the authors of this reference in order to be able to fill a disposable filter. Unfortunately, carbon particulates will load up a trap at a rate of 20 grams per 80 miles of vehicle operation, necessitating disposal of the trap too frequently. If on-board trapping of particulates and precipitates is to avoid trap disposal, then the collected particles must be periodically combusted and reduced to harmless gases and released to atmosphere. Thus, trap regeneration is a necessity.

Cooling of exhaust gases is also disclosed in U.S. Pat. No. 3,100,146, wherein a smog reducing device utilizes both gas to gas and gas to liquid heat exchangers to insure a steep drop in the exhaust gas temperature to promote condensation of substantially all of the partially burned and oxygenated hydrocarbon vapors. Since this patent does not relate to diesel engines, the carbon particulate content is low, forcing the hydrocarbons to agglomerate independently by themselves to produce saturated globules. Such globules are attracted to an impingement filter, of the disposable kind, without regeneration. Thus, this reference does not direct itself to the problem of utilizing cooling to facilitate regeneration.

With the advent of adiabatic diesel engines wherein engine cooling may be entirely eliminated, there will be no engine waste heat available for heating a vehicle cabin. Extraction of heat after it enters the exhaust system would be welcomed for use to heat the vehicle cabin. The prior art has only dealt with cooling of exhaust for engines that already have their own engine cooling system. The above discussed prior art deals with a contemplated exhaust gas temperature drop of only 100°–180° F. for conventional internal combustion engine use for passenger vehicles where the exhaust gas temperature is no higher than 300°–400° F. and the extraction of heat from such exhaust gas temperature results in a comparatively small temperature drop and heat content extraction. Exhaust gas temperatures from an adiabatic engine will be much higher due to the absence of an engine cooling system and due to the presence of insulating materials retaining the heat of the engine. To substantially cool such high exhaust gas to a temperature below 200°–150° F. in accordance with the teachings of the two above-mentioned references would not be economically feasible except under certain unusual engine operating conditions. The exhaust gas temperature can be dropped 30–60%, however, by use of gas/liquid heat exchangers resulting in temperature drops of up to 500°–600° F. with the exhaust gas temperature still remaining above 200° F. This results in only partial condensation of hydrocarbons, but the heat extraction content is significant. Such heat content can be used for cabin heating, etc.

The controls for regeneration present still another problem associated with extraction of carbon particulates of diesel engines. Heretofore, the prior art has progressed in the direction of greater control complexity, such as by the use of computers to digest a variety of operating parameters for deciding when to establish regeneration and for how long (see U.S. Pat. Nos. 4,544,388; 4,492,079; and 4,567,725). It would be desirable if such controls could be reduced in complexity without affecting reliability.

SUMMARY OF THE INVENTION

It is a primary object of this invention to provide a regenerative system for an exhaust emission particulate trap which (a) requires less energy to operate than state of the art regeneration systems; (b) regenerates more quickly; and (c) functions reliably with simpler controls.

It is another object of this invention to provide an apparatus for regenerating a particulate trap which employs cooling of the exhaust gas to promote only partial condensation of hydrocarbons while effectively extracting a sufficient amount of heat content which can be effective for cabin heating.

The invention is an apparatus adapted for use with an internal combustion engine having a primary exhaust conduit, a flow divider defining parallel exhaust conduits connected to the primary exhaust conduit, and a pair of particulate traps, one disposed in each of the parallel exhaust conduits for collecting exhaust particulates, each of the traps having a frontal face exposed to the exhaust gas flow in one of the parallel exhaust conduits. The apparatus comprises, essentially: (a) a heat exchange means disposed in the primary exhaust conduit for reducing the temperature of the exhaust gases; (b) separate syphon means to conduct a separate syphoned flow of exhaust gas from the primary exhaust conduit around the heat exchanger to the frontal face of each of the traps; (c) separate valves, each being responsive to a pressure differential between the primary exhaust conduit and a different parallel exhaust conduit to separately control each flow of exhaust gas through the syphon means; (d) flow control means for selectively promoting a pressure differential between one of the parallel exhaust conduits and the primary exhaust conduit while dissipating any significant difference between the primary exhaust conduit and the other parallel exhaust conduit; and (e) means to augment the heat of said syphoned exhaust gas to facilitate ignition of said collected particles at the frontal face of a trap exposed to such exhaust gas.

Preferably the heat exchanger is effective to reduce the temperature of the exhaust gas in the primary conduit from a temperature of 300°–900° F. to a range in which partial condensation occurs at 200°-500° F. respectively. The extracted heat due to such temperature reduction is conveyed for use in heating another zone such as the vehicle cabin.

Preferably the flow control means comprises a pair of coordinated butterfly valves, one in each of the parallel exhaust conduits. When one of the valves is closed, the opposite is opened, thereby setting up a pressure differential between the primary conduit and the parallel exhaust conduit in which the butterfly valve is open, while no significant pressure differential is experienced between the primary conduit and the parallel exhaust conduit in which the valve is closed. Preferably the syphon means comprises a pair of flow channels connecting the primary conduit with the frontal face of each of the traps, the channels each being effective to convey a high temperature exhaust at a velocity in the range of 3-8 cfm. The syphoned flow channels are operated in response to self regulating valves, each comprised of a reed valve responsive to the pressure differential between the primary exhaust conduit and a different parallel exhaust conduit.

BRIEF DESCRIPTION OF THE DRAWINGS

The FIGURE is a schematic view of the apparatus of this invention showing the heat exchanger and one of the exhaust conduits partially broken away to expose interior equipment.

DETAILED DESCRIPTION AND BEST MODE

The preferred embodiment of this invention comprises the following major components:

A. A split flow particulate filter system for an internal combustion engine 10, preferably a diesel engine, with the particulate traps 11 and 12, each employing a regeneration system which heats the particulates. The particulate filter system is further comprised of: (i) a primary exhaust conduit 15, (ii) a flow divider which defines parallel exhaust conduits 17 and 18 and is connected to the primary exhaust conduit as illustrated in the FIGURE, (iii) a pair of particulate traps 11 and 12, one disposed in each of the parallel exhaust conduits 17,18 for collecting exhaust particulates, each of the traps have a frontal face 19 exposed to the exhaust gas flow 20 in one of the parallel exhaust conduits.

B. A heat exchanger disposed in the primary exhaust conduit 15 for reducing the temperature of the exhaust gases for promoting partial condensation of the hydrocarbons.

C. Two passive hot exhaust bypass tubes 21 and 22.

D. Controls for establishing the regeneration cycle using the above apparatus, such controls comprise: a pair of reed valves 23,24, each responsive to a pressure differential between the primary exhaust conduit 15 and a different parallel exhaust conduit (17,18) to separately control flow of exhaust gas through each of the syphon tubes 21,22; a flow control means 25 for selectively promoting a pressure differential between one of the parallel exhaust conduits and the primary exhaust conduit while dissipating any significant pressure difference between the primary exhaust conduit and the other parallel exhaust conduit; and means 13 to augment the heat of the syphoned exhaust gas to facilitate ignition of the collected particles at the frontal face of the trap exposed to such exhaust gas.

Split Flow Particulate Trap System

The use of split flow particulate filter or trap system is known in the art today. The vehicle has a power plant comprised particularly of a diesel engine which by the nature of the engine's function tends to emit an exhaust gas containing a high content of carbon particulates. The vehicle for such engine also has a passenger cabin, the cabin requiring heating when the vehicle is used in colder climates. The primary exhaust conduit 15 leads from the exhaust manifold 26 of the engine and is effective to convey exhaust gases below the floor of the cabin 14. The flow divider 16 defining the parallel exhaust conduits is integrally connected to the primary exhaust conduit and each of the parallel exhaust conduits connect to a trap 11 or 12.

It is desirable that the separate traps be generally equal in size so that one trap may be operatively filtering at one time while the other trap is undergoing regeneration. Alternatively, both traps may be filtering simultaneously and each of the traps is periodically subjected to regeneration. Advantageously, the filter material has an average total volume of about 0.8-2.5 times the engine displacement so that the normal collection of particles is in the range of 100-250 mg/in$^3$ and may be oxidized within a regeneration period of 1-8 minutes. The exhaust gas flow through the primary conduit and into the divided parallel conduits typically has a flow rate of 30-90 cfm, the flow rate being dependent upon engine speed.

The ceramic material for the filter or trap is formed into a honeycomb structure for cellular wall flow as is well known. The mode of entrapment of such honeycomb ceramic filter is by way of interception; particulates larger than approximately the mean pore size of the ceramic material are intercepted and prevented from passing through the material. The art of making such trap materials is more fully described in *Society of Automotive Engineers*, Publication Nos. 81114 and 810118, the descriptions of which are incorporated herein by reference.

This invention requires the use of a split flow particulate trap system because of the manner in which the loaded trap is regenerated and controlled, requiring the presence of a pressure differential in one of the parallel conduits while the other has a pressure differential effective to initiate flow through a bypass syphon tube.

Heat Exchanger

The heat exchanger B can be similar to that utilized for engine cooling in a conventional automobile, having a gas to liquid heat transfer assembly in which the hot exhaust gases 20 flow across a heat conductive metal matrix 27 supported on cooling tubes 28 carrying the cooling fluid (propylene glycol). The fluid flows in at 29 and exits at 30 to enter a radiator 31 in the cabin. It is preferable that the heat exchanger be mounted close to the engine exhaust manifold, after turbocharging has been staged. The cooling medium can alternatively be forced air so that the heat exchanger functions on a gas/gas principle. This may be desirable in large truck applications where it is possible to force cooling air through the heat exchanger with sufficient velocity and quantity.

It is advantageous that the heat exchanger be sized so that it can create a temperature drop in the exhaust gas in the range of 200°-500° F. Normal diesel engine exhaust temperatures can reach temperatures as high as 1100° F. (600° C.) during normal driving conditions. However, it is more typical that, under normal loads and speeds, temperatures will be in the range of 700°-850° F. with the exhaust temperature being about 550°-600° F. at idle, and as high as 950° F. at full load and speed. Thus, it is desirable that when operating at full load and speed, the exhaust gas temperature must be reduced to about 500° F., requiring a 450° F. temperature drop, and when operating at idle conditions, the exhaust gas temperature should be reduced from about 600° F. to 350° F. In the case of an automobile having a conventional gasoline engine, the exhaust temperatures are typically in the range of 225°-350° F. with such engines usually experiencing an exhaust gas temperature of about 225° F. at idle and as much as 350° F. at full load and speed. In the latter cases, the cooling system must be effective in reducing the exhaust gas temperature to about 160° F. when at idle, and to about 200° F. when at full load and speed.

It is a significant advantage of the present invention that the heat extracted by the heat exchanger is deployed for heating the cabin when needed rather than being dumped to atmosphere. To this end, the exchange medium (cooling liquid or forced air) can be conveyed to a suitable heat exchanger 31 in the cabin and used for heating purposes. To deploy the heat extracted for purposes of both partial hydrocarbon condensation and cabin heating is considered an unobvious use and an advantage resulting from the combination apparatus of this invention.

The heat exchanger has a function to promote partial condensation of hydrocarbons. As the exhaust gas flows through the heat exchanger, the temperature of the gas is reduced and the volume of the gas flowing through the trap is correspondingly reduced as a result of the temperature drop; the back-pressure will also be lower. This results in a reduction of the fuel economy penalty due to the trap. Also, the temperature reduction promotes hydrocarbon condensation on the carbon particulates as they flow through the exhaust, thereby coating such particles prior to their being trapped in the filter. Since the temperature drop creates an environment for a greater percentage of the hydrocarbons to condense out, the carbon particulates will be coated with a higher percentage of hydrocarbon than heretofore possible without cooling. Hydrocarbons have been found to be particularly useful in this invention because they have an ignition temperature which is much lower than that of the carbon particulates. For example, carbon particulates will typically require an ignition temperature in the range of 1000°-1200° F. (600° C.), whereas the hydrocarbons will ignite at a temperature as low as 450° F. and typically about 500° F.

The heat exchanger must be designed so that not all of the hydrocarbons are condensed out because (i) this requires too much energy (regeneration will function adequately with only partial condensation), and (ii) the condensation of heavy hydrocarbons (which condense out at lower temperatures) should be avoided since they inhibit lite-off or reduction in the temperature of ignition of the carbon particulates. For example, with the temperature reduced to the level of 350°-500° F., approximately 30-50% of the hydrocarbons in the exhaust gas will condense out on the carbon particulates as opposed to 70°-80% of the hydrocarbons if such exhaust gas temperature were cooled to temperatures below 200° F. At such significantly lower temperatures such as utilized by the prior art, all of the hydrocarbons will typically condense out except for methane and propane. But the use of temperature reduction in the range of 200°-500° F. is significantly helpful in doubling the condensation of hydrocarbons from the normal exhaust gas temperatures.

With the carbon particulates having a higher content of condensed hydrocarbons, the particulates will ignite and light off more readily and the entire trap regeneration energy requirements are accordingly reduced.

Syphon Tubes

The hot exhaust bypass tubes 21,22 are equipped with passive reed valves 23,24, respectively, at their entrances; the valves open only when the pressure difference exceeds certain small values. These valves can alternatively be activated thermostatically by means of a bimetallic strip. In any case, the hot exhaust 20 flows into the trap through the tubes 21,22 only at high temperature (uncooled) and high flow conditions. The activation of the valves can occur at the high speed/high load condition of the engine, or when the controls D for the regeneration system are effective to create a pressure differential between one of the parallel exhaust conduits and the primary exhaust conduit while dissipating any significant pressure difference between the primary exhaust conduit and the other parallel conduit. When such pressure difference is significantly small, the reed valve will stay closed and there will be no flow through the respective syphon tube since the entire exhaust will be flowing through the other parallel exhaust conduit.

The syphon tubes are sized to permit a small but high velocity and high temperature flow therethrough, the velocity being regulated to be in the range of 3-8 cfm. It is important that the flow be relatively low volume so that the thermodynamics of ignition of the particulate collection is facilitated and not quenched.

Controls for Establishing Regenerative Cycle

The flow control D selectively promotes a pressure differential between the one of the parallel exhaust conduits 17,18 and the primary exhaust conduit 15 while dissipating any significant pressure difference between the primary exhaust conduit and the other parallel exhaust conduit. To this end, flow diverter valve 35 is interposed in parallel exhaust conduit 18 and valve 36 is disposed in exhaust conduit 17; they are coordinated so that when one is closed the other is fully opened (as shown). The diverter valves can be of a butterfly construction. When one of the diverter valves, such as 36, is moved to the open position, the reed valve 24 associated with the syphon tube 22 for that particular side of the split flow will remain closed since the pressure difference between the outlet 37 at the face of the trap and the inlet at the front of heat exchanger is relatively small. The entire exhaust flow will flow through parallel exhaust conduit 17 while reed valve 24 prevents flow through the associated syphon tube 22.

With respect to the other parallel exhaust conduit 18, the flow diverter valve 35 associated therewith is closed to cause all exhaust flow to flow through conduit 17. There is created a relatively large pressure difference across the reed valve 23 due to the difference of pressure at the inlet at the front of the heat exchanger and the pressure at the outlet 38. Accordingly, the reed valve 23 will open, permitting the hot (uncooled) exhaust to flow through the syphon tube 21. The reed valves should be designed to permit a maximum flow not to exceed 8 cfm at the highest engine speed and load condition and at least 3 cfm for the lowest engine speed and load condition, such as during idle.

The flow control means 25 comprises a mechanism 40 serving to coordinate operation of the diverter valves 35,36. Mechanism 40 may be designed to act in response to a pressure condition which is proportionate to the accumulation of carbon particulates in the trap. When the back-pressure increases at the frontal face 19 of one of the traps, and the pressure sensor (not shown), associated therewith, provides a signal output that is read by the engine electronic control system to monitor the exhaust temperature, fuel flow and engine speed (see U.S. Pat. No. 4,538,411), a trigger signal is set up to initiate the regeneration cycle at a preset set of conditions. Alternatively, in the absence of such complex control system, the device can be operated on a continuous regeneration mode in which one side of the system will be filtering while the other side will be regenerating; a simple timer control can periodically switch the function from one side to the other. In this manner, the butterfly valves can be coordinated so that while one is on the other is off, all in response to a simple timer control.

The controls D further comprise means 13 to augment the heat of the syphoned exhaust gas to facilitate ignition of the collected particles at the frontal face of the trap exposed to such exhaust gas. This may comprise electrical heater elements of conventional sheathed resistor type (such design being further disclosed in U.S. Pat. No. 4,544,388) embedded in a catalytically coated matrix of ceramic fiber, cellular foam, or wire mesh. Alternatively, the resistance heaters may be separated from the catalyzed material which may be contained in a separate bed adjacent thereto. The catalytic material may comprise a low $SO_2$ active oxidation catalyst such as platinum, tungsten or palladium-platinum coated on a porous, cellular cordierite body with approximately 20 cells per linear inch. The power requirement for such electrical heating elements should be approximately 2000 watts which is adequate to heat the catalyzed wire mesh (or other material) and heater to 1400° F. within three minutes with 3 cfm flow (low range flow) from the syphon tubes. At high engine load and speed conditions, the heating element should be effective to heat the exhaust gas to 950° F. within three minutes at a flow rate of 8 cfm.

As the heater temperature rises to heat the exhaust to over 900° F., the particulates collected in the catalyzed wire mesh will ignite and light off. Since the particulates collected in the ceramic filter can contain a very large fraction of readily combustible condensed hydrocarbons, the light off occurs also at the face of the filter and the filter regeneration is initiated. The combustions will progressively move axially along the filter as the particulates burn, much in the fashion of a lighted cigarette. As the combustion front reaches the end of the particulate trap, the augmenting heater means is turned off in response to a temperature sensor. The regeneration time will be approximately 6-9 minutes. At the high speed/load condition, the exhaust gas temperature is high enough (950° F.) to provide particulate light off without the necessity for the electric heating power.

After a preset time after regeneration is complete, the flow diverter valves can both be opened to continue simultaneous filtering through both traps, or the diverter valve may be reversed in position so that the other filter trap is regenerated.

EXAMPLES

An apparatus substantially the same as the one described above was employed on a Ford Tractor 7.8L heavy duty diesel engine. Emission tests were conducted after the appratus was run through the following cycle. With an exhaust gas temperature at approximately 300°-350° F., using the heat exchanger, the particulate trap soot ignition occurred at less than 600° F. and the complete trap regeneration time was less than five minutes. For an identical regeneration cycle with the particulates collected for an exhaust gas temperature of 850°-900° F., with no use of the heat exchanger, the soot ignition apparently occurred at approximately 900° F. and the entire trap regeneration time was 7.8 minutes. The overall cycle energy consumption for the two cases was 350 watt hours and 475 watt hours, respectively.

While particular embodiments of the invention have been illustrated and described, it will be obvious to those skilled in the art that various changes and modifications may be made without departing from the invention, and it is intended to cover in the appended claims all such changes and modifications which fall within the true spirit and scope of the invention.

We claim:

1. An apparatus for use with an internal combustion engine having (i) a primary exhaust conduit, (ii) a flow divider defining parallel exhaust conduits, and (iii) a pair of particulate traps, one disposed in each of the parallel exhaust conduits for collecting exhaust particles, each of said traps having a frontal face exposed to the exhaust gas flow in one of the parallel exhaust conduits, comprising:
    (a) heat exchange means disposed in said primary exhaust conduit for reducing the temperature of the exhaust gases;
    (b) separate syphon means to conduct a syphoned flow of said exhaust gas in said primary exhaust conduit around said heat exchanger to the frontal face of each of said traps;
    (c) separate valves, each responsive to a pressure differential between the primary exhaust conduit and a parallel exhaust conduit to control the flow of exhaust gas through each of said syphon means;
    (d) flow control means for selectively promoting a pressure differential between one of the parallel exhaust conduits and primary exhaust conduit while dissipating any significant pressure difference between the primary exhaust conduit and the other parallel exhaust conduit; and
    (e) means to augment the heat of said syphoned exhaust gas to facilitate ignition of said collected particles at the front face of a trap exposed to such exhaust gas.

2. The apparatus as in claim 1, in which the temperature of said exhaust gas in said primary exhaust conduit is in the range of 300°-900° F. and said heat exchange means is effective to reduce said temperature to the range of 200°-500° F.

3. The apparatus as in claim 1, in which said means to augment is only utilized when said exhaust gas temperature in said primary exhaust conduit is below 900° F.

4. The apparatus as in claim 1, in which said reduced temperature is to a range which encourages condensation of hydrocarbons.

5. The apparatus as in claim 1, in which said separate valves each comprise a flap valve.

6. The apparatus as in claim 1, in which said flow control means is responsive to the back-pressure at a trap face to initiate the pressure differential and establish ignition of said collected particles in that temperature range.

7. The apparatus as in claim 1, in which said flow control means comprises a butterfly valve in each of said parallel exhaust conduits.

8. The apparatus as in claim 1, in which said syphoned flow is in the range of 3-8 cfm.

9. The apparatus as in claim 1, in which said flow control means is selectively actuated in response to a timing mechanism having a predetermined interval.

10. The apparatus as in claim 1, in which said means to augment is effective to heat the exhaust gas to 1400° F. within three minutes with a low range cfm and to augment the heating of the exhaust gas to 950° F. within three minutes with high range cfm, such as 8 cfm.

11. The apparatus as in claim 1, in which said means to augment is comprised of an electric heater coup led with a catalytic material.

12. The apparatus as in claim 11, in which said catalytic material is comprised of a low $SO_2$ active oxidation catalyst such as palladium, tungsten or platinum-palladium.

13. The apparatus as in claim 1, in which said means to augment comprises a sheathed resistor type heating element embedded in a catalytically coated matrix of ceramic woven fiber or cellular foam, said resistor having a heating capacity of about 2000 watts.

14. A method of regenerating a particulate trap of an internal combustion engine having exhaust gas arranged to pass through said trap for making said collection, the method comprising:
    (a) reducing the temperature of said exhaust gas received from a primary exhaust conduit to facilitate condensation of hydrocarbons on said particulates;
    (b) dividing said exhaust flow between parallel exhaust conduits;
    (c) interposing a trap in each of said parallel exhaust conduits;
    (d) selectively syphoning a portion of said exhaust gas around said heat exchanger without substantial loss of heat to thereby expose said portion to the frontal face of one trap; and
    (e) augmenting the temperature of said syphoned exhaust gas, if needed, to ignite the particulates of said one trap.

15. The method as in claim 14, in which said reduction of temperature is carried out by use of a heat exchanger and the extracted heat is conveyed for utilization in heating. the cabin of said vehicle.

16. The method as in claim 14, in which said temperature to which said exhaust gas is reduced is from 300°-1000° F. to the range of 200°-600° F.

17. The method as in claim 14, in which each of said traps are comprised of cellular wall flow honeycomb filter design.

18. The method as in claim 14, in which said syphoning is initiated in response to a sensing of back-pressure immediately upstream of said trap when it exceeds a predetermined level.

19. The method as in claim 14, in which said temperature augmentation is carried out by use of an electric heater accompanied by catalytic material.

* * * * *